US008830047B2

(12) United States Patent
Dowling

(10) Patent No.: US 8,830,047 B2
(45) Date of Patent: Sep. 9, 2014

(54) SYSTEM AND METHOD FOR MONITORING TRANSPORTATION SYSTEM VEHICLE OPERATOR USE OF MOBILE DEVICES

(75) Inventor: Anne Dowling, Bayside, NY (US)

(73) Assignee: Clever Devices, Ltd., Woodbury, NY (US)

( * ) Notice: Subject to any disclaimer, the term of this patent is extended or adjusted under 35 U.S.C. 154(b) by 558 days.

(21) Appl. No.: 13/182,892

(22) Filed: Jul. 14, 2011

(65) Prior Publication Data

US 2012/0013457 A1 Jan. 19, 2012

Related U.S. Application Data

(60) Provisional application No. 61/364,241, filed on Jul. 14, 2010.

(51) Int. Cl.
*B60Q 1/00* (2006.01)

(52) U.S. Cl.
USPC ... 340/439; 340/436; 340/539.11; 455/569.2; 455/575.7; 455/575.9

(58) Field of Classification Search
USPC .................. 340/439, 436, 426.2, 461, 539.1, 340/539.11; 455/1, 345, 406, 407, 569.1, 455/569.2, 575.7, 575.9
See application file for complete search history.

(56) References Cited

U.S. PATENT DOCUMENTS

| | | | | |
|---|---|---|---|---|
| 5,684,861 | A * | 11/1997 | Lewis et al. | 455/405 |
| 7,123,874 | B1 * | 10/2006 | Brennan | 455/1 |
| 8,044,794 | B2 * | 10/2011 | Chauncey et al. | 340/539.11 |
| 8,060,150 | B2 * | 11/2011 | Mendenhall et al. | 455/569.2 |
| 8,335,598 | B2 * | 12/2012 | Dickerhoof et al. | 701/2 |
| 2009/0215387 | A1 * | 8/2009 | Brennan et al. | 455/1 |

* cited by examiner

*Primary Examiner* — Hung T. Nguyen
(74) *Attorney, Agent, or Firm* — The Farrell Law Firm, P.C.

(57) ABSTRACT

A system and method are provided for monitoring transportation system vehicle operator use of a mobile device. A directional antenna detects a signal produced by a mobile device within a vehicle operator area of a transit vehicle. The signal is transmitted from the directional antenna to an antenna controller. An event signal corresponding to the signal is generated at the antenna controller and the event signal is transmitted from the antenna controller to a logic unit. The logic unit determines a current status of the vehicle. The logic unit stores mobile device use event data in a memory based on the event signal and the current status of the vehicle.

20 Claims, 4 Drawing Sheets

SYSTEM AND METHOD FOR MONITORING TRANSPORTATION SYSTEM VEHICLE OPERATOR USE OF MOBILE DEVICES

PRIORITY

This application claims priority under 35 U.S.C. §119(e) to U.S. Provisional Patent Application No. 61/364,241 filed on Jul. 14, 2010, entitled "CELLULAR DEVICE USE MONITORING AND CONTROL BY TRANSPORTATION SYSTEM VEHICLE OPERATORS," the entire disclosure of which is incorporated herein by reference.

BACKGROUND OF THE INVENTION

1. Field of the Invention

The present invention relates generally to transportation systems, and more particularly, to a method and system for monitoring transportation system vehicle operator use of mobile devices.

2. Description of the Related Art

Public transit is a part of every-day life in many parts of the world and, in particular, urban environments. With the advent of cellular technologies, talking, texting, and browsing the web on mobile devices, such as cellular phones, has become exceedingly common. A growing problem is the use of mobile devices while driving a motor vehicle, which may cause drivers to pay less attention to the road. Several states have attempted to address this problem by issuing traffic summonses to drivers who use mobile devices while driving without a hands-free device, such as a Bluetooth headset. However, not all states have enacted such prohibitions, in certain states such laws do not apply to all drivers, and the penalties are generally not particularly severe.

More importantly, drivers and operators controlling transit vehicles in various transportation systems such as a taxi system, paratransit system, a school transportation system, a rail system, a bus system and the like, also have the ability to use mobile devices while driving. In the case of drivers of public transportation vehicles, distracted driving caused by mobile device use may have particularly devastating consequences due to the large number of passengers aboard. While transportation system rules and regulations may restrict mobile device use, these rules may be difficult to enforce due to an inability to monitor drivers and operators.

SUMMARY OF THE INVENTION

The present invention has been made to address at least the above problems and/or disadvantages and to provide at least the advantages described below. Accordingly, an aspect of the present invention provides a method and system for monitoring transportation system vehicle operator use of mobile devices.

According to one aspect of the present invention, a system is provided for monitoring transportation system vehicle operator use of a mobile device. The system includes a directional antenna for detecting a signal produced by a mobile device within a vehicle operator area of a transit vehicle. The system also includes an antenna controller for receiving the signal from the directional antenna and generating an event signal corresponding to the signal. The system further includes a logic unit for receiving the event signal from the antenna controller, determining a current status of the vehicle, and storing mobile device use event data in a memory based on the event signal and the current status of the vehicle.

According to another aspect of the present invention, a method is provided for monitoring transportation system vehicle operator use of a mobile device. A directional antenna detects a signal produced by a mobile device within a vehicle operator area of a transit vehicle. The signal is transmitted from the directional antenna to an antenna controller. An event signal corresponding to the signal is generated at the antenna controller and the event signal is transmitted from the antenna controller to a logic unit. The logic unit determines a current status of the vehicle. The logic unit stores mobile device use event data in a memory based on the event signal and the current status of the vehicle.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Preferred embodiments of the present invention are described in detail with reference to the accompanying drawings. Detailed descriptions of constructions or processes known in the art may be omitted to avoid obscuring the subject matter of the present invention. Further, in the following description of the present invention, various specific definitions found in the following description are provided only to provide a general understanding of the present invention, and it is apparent to those skilled in the art that the present invention can be implemented without such definitions.

Figure 1:
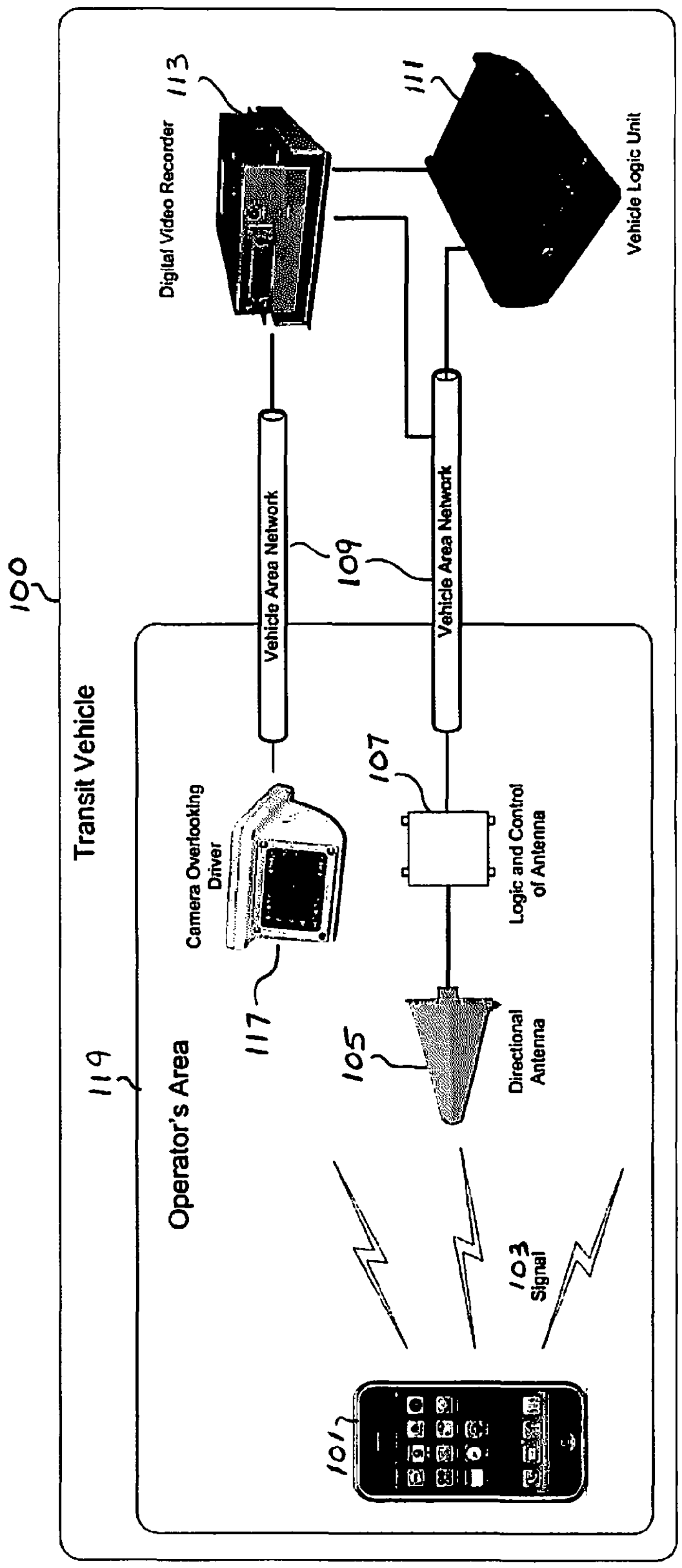
FIG. 1 is a diagram illustrating components of a system for monitoring transportation system vehicle operator use of a mobile device, according to an embodiment of the present invention.

Referring initially to FIG. 1, a diagram illustrates a system for monitoring transportation system vehicle operator use of mobile devices, according to an embodiment of the present invention. A mobile device 101 in an operator's area 119 of a transit vehicle 100 is able to transmit and receive a signal 103, such as a cellular signal. The system includes a directional antenna 105 in the operator's area 119 for detecting the transmitted signal. The system also includes an antenna controller 107 that implements the logic and control of the antenna 105. The antenna controller 107 communicates with a logic unit 111 via a network, such as Vehicle Area Network (VAN) 109. The system also includes a video recorder 113, which is connected to the logic unit 111. The video recorder 113 is also connected, via the VAN 109, to a camera 117 overlooking the operator in the operator's area 119. In the embodiment of the present invention illustrated in FIG. 1, the logic unit 111 may be implemented as a vehicle logic unit, and the video recorder 113 may be implemented as a digital video recorder. Further, all elements of FIG. 1 are provided on the transit vehicle 100. While FIG. 1 shows one embodiment of the system, components and configurations may vary depending on the vehicle and transportation system type.

Figure 2:
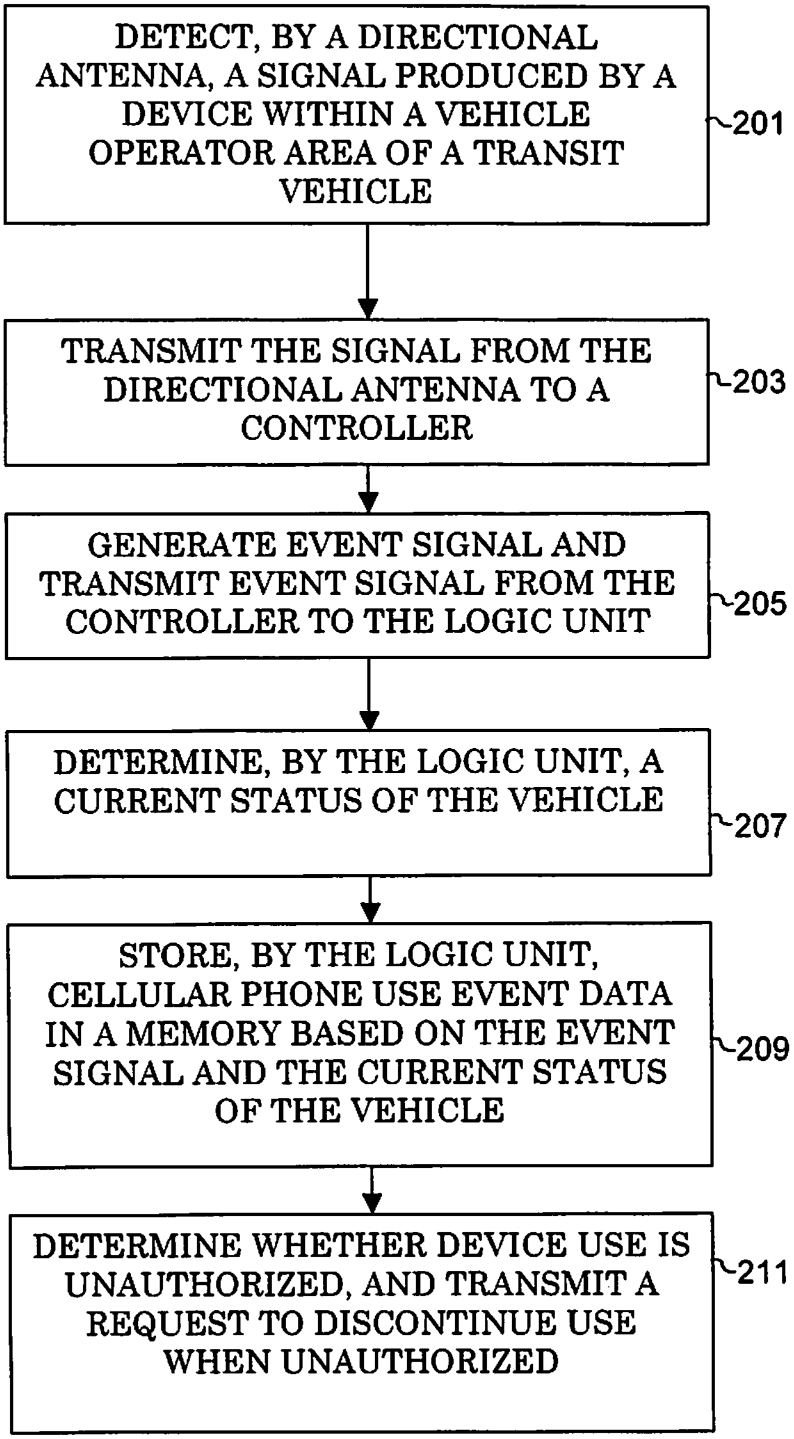
FIG. 2 is a flowchart illustrating a method for monitoring transportation system vehicle operator use of a mobile device, according to an embodiment of the present invention.

Referring to FIG. 2, a flowchart illustrates a method for monitoring transportation system vehicle operator use of mobile devices, according to an embodiment of the present invention. In an embodiment of the present invention, the monitoring system may activate when the transit vehicle is powered up. In step 201, the directional antenna 105 detects the signal 103 produced by the mobile device 101 within the vehicle operator's area 119 of the transit vehicle 100. In step 203, the directional antenna 105 transmits the signal 103 to the antenna controller 107. In step 205, the antenna controller 107 generates an event signal from the received signal 103, and transmits the event signal to the logic unit 111, over, for example, the VAN 109. The event signal may include a date and time that the signal 103 was received by the directional antenna 105. In step 207, the logic unit 111 determines the current status of the vehicle 100. The current status of the vehicle may be, for example, en route, on break, or end of route. In step 209, the logic unit 111 stores mobile device use event data in a memory based on the received event signal and the determined current status of the vehicle. The use event data may be stored for future reporting or administrative actions. Such information can be offloaded from the transit vehicle 100 via a manual transmission, a wireless Local Area Network (LAN), or a real-time wireless transmission. In step 211, it is determined whether operator use of the mobile device is authorized, and a request to discontinue use of the mobile device is sent to the operator when use is not authorized.

In an embodiment of the present invention, the logic unit 111 performs step 211 of FIG. 2 and determines whether the operator may use the mobile device 101 based on the stored mobile device use event data. The logic unit 111 then transmits a message to the operator of the transit vehicle 100, over the VAN 109, requesting that the operator discontinue use of the mobile device 101, when use of the mobile device 101 is not authorized. The message may be displayed to the operator over an operator interface of the transit vehicle 100.

Figure 3:
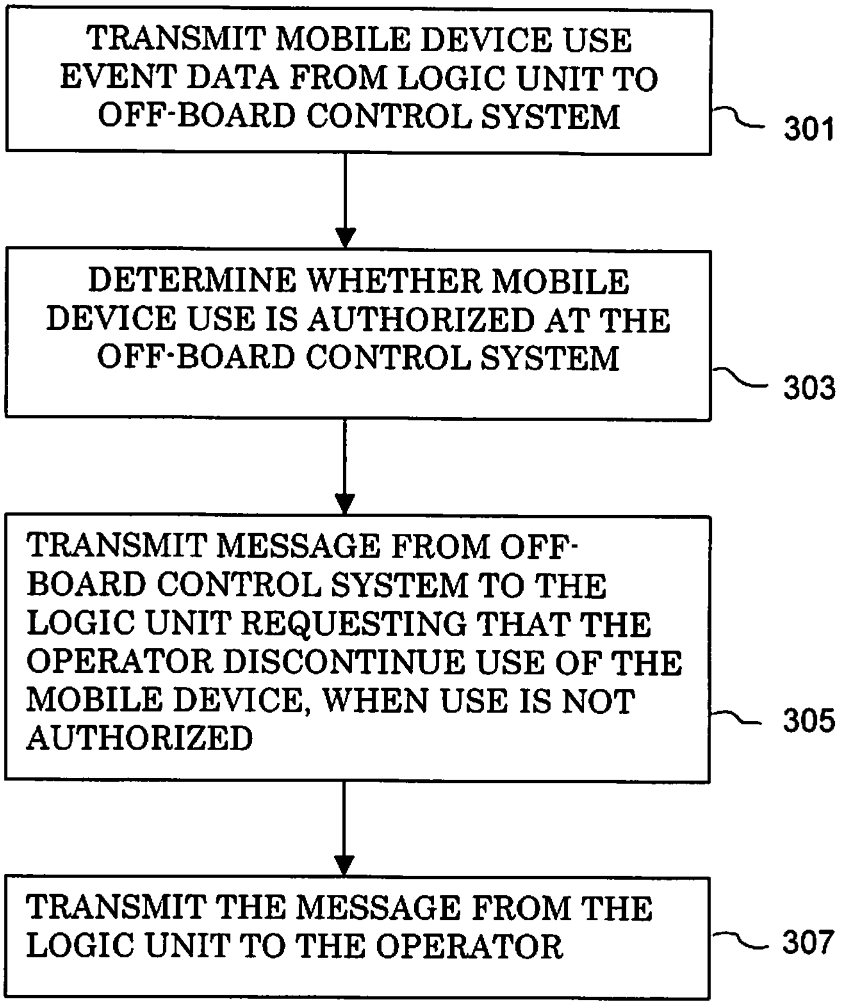
FIG. 3 is a flowchart illustrating a method for notifying a transportation system vehicle operator of unauthorized use of a mobile device, according to an embodiment of the present invention.

FIG. 3 is a flowchart illustrating a method for notifying an operator of unauthorized use of a mobile device, according to an embodiment of the present invention. Specifically, FIG. 3 may be considered a detailed description of step 211 in FIG. 2. In step 301, the logic unit 111 transmits the mobile device use event data to an off-board control system in real-time. The off-board control system is not located on the transit vehicle 100, and the mobile device use event data may be sent via any available wireless communication method. In step 303, the off-board control system determines whether mobile device use is authorized based on the received mobile device use event data. In step 305, the off-board control system transmits a message to the logic unit 111 that requests that the transportation system vehicle operator discontinue use of the mobile device, if it is determined that use of the mobile device is not authorized. This message may be sent via any available wireless communication method. The message may be predefined or may be manually written. In step 307, the vehicle logic unit 111 transmits the message to the operator, over the VAN 109, requesting the operator to discontinue use of the mobile device. The message is provided to the operator over the operator interface of the vehicle.

Figure 4:
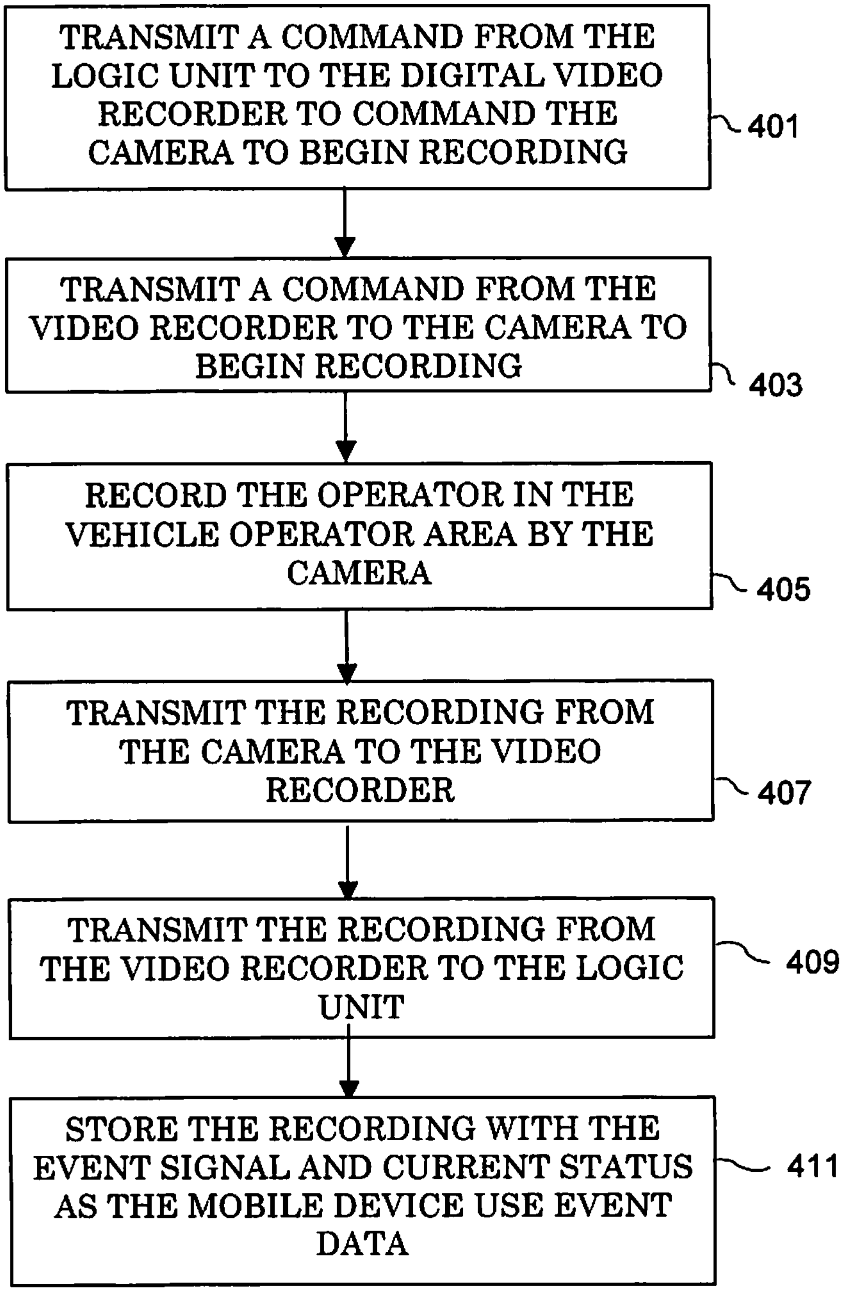
FIG. 4 is a flowchart illustrating a method for gathering and storing additional mobile device use event data, according to an embodiment of the present invention.

Referring now to FIG. 4, a flowchart illustrates a method for gathering and storing additional mobile device use event data, according to an embodiment of the present invention. Specifically, FIG. 4 may be considered a detailed description of step 209 in FIG. 2. In step 401, the logic unit 111 transmits a command to the video recorder 113 to command the camera 117 to begin recording based on the current status of the vehicle 100 and the received event signal. In step 403, the video recorder 113 transmits a command to the camera, over the VAN 109, to begin recording. In step 405, the camera 117 records the transportation system vehicle operator in the operator's area 119. In step 407, the camera 117 transmits the recording to the video recorder 113 over the VAN 109. In step 409, the video recorder 113 transmits the recording to the logic unit 111. In step 411, the logic unit 111 stores the received recording in the memory with the corresponding event signal and current status as mobile device use event data. The combination of the event signal, the current status and the recording may then be used to determine whether mobile device use is authorized in step 211 of FIG. 2.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A system for monitoring transportation system vehicle operator use of a mobile device, the system comprising:

a directional antenna for detecting a signal produced by a mobile device within a vehicle operator area of a transit vehicle;

an antenna controller for receiving the signal from the directional antenna and generating an event signal corresponding to the signal; and a logic unit for:

receiving the event signal from the antenna controller, determining a current status of the vehicle, and storing mobile device use event data in a memory based on the event signal and the current status of the vehicle.

2. The system of claim 1, wherein the event signal comprises a time and date that the directional antenna detected the signal.

3. The system of claim 1, wherein the logic unit determines whether use of the mobile device is authorized based on the mobile device use event data.

4. The system of claim 3, wherein the logic unit transmits a message to a transportation system vehicle operator requesting that the transportation system vehicle operator discontinue the use of the mobile device, when the use the mobile device is not authorized.

5. The system of claim 4, wherein the message is displayed to the transportation system vehicle operator over an operator interface.

6. The system of claim 1, further comprising an off-board control system for receiving the mobile device use event data in real-time from the logic unit, determining whether use of the mobile device is authorized based on the mobile device use event data, and transmitting a message to the logic unit requesting that a transportation system vehicle operator discontinue the use of the mobile device when the system determines that the use of the mobile device is not authorized; and wherein the logic unit transmits the message to the transportation system vehicle operator requesting that the transportation system vehicle operator discontinue the use of the mobile device.

7. The system of claim 6, wherein the message is at least one of pre-defined and manually written.

8. The system of claim 1, further comprising:

a video recorder for receiving a command from the logic unit to command a camera to being recording based on the mobile device use event data, transmitting the command to the camera to begin recording, receiving a recording from the camera, and transmitting the recording to the logic unit; and the camera for receiving the command to begin recording, recording the transportation system vehicle operator in the vehicle operator area, and transmitting the recording to the video recorder.

9. The system of claim 8, wherein the logic unit stores the recording in the memory with the corresponding event signal and current status as the mobile device use event data.

10. The system of claim 1, wherein the system is activated when the transit vehicle is powered up.

11. The system of claim 1, wherein the current status comprises at least one of en route, on break and end of route.

12. A method for monitoring transportation system vehicle operator use of a mobile device, the method comprising the steps of:

detecting, by a directional antenna, a signal produced by a mobile device within a vehicle operator area of a transit vehicle;

transmitting the signal from the directional antenna to an antenna controller;

generating an event signal corresponding to the signal at the antenna controller and transmitting the event signal from the antenna controller to a logic unit;

determining, by the logic unit, a current status of the vehicle; and storing, by the logic unit, mobile device use event data in a memory based on the event signal and the current status of the vehicle.

13. The method of claim 12, further comprising:

determining, by the logic unit, whether use of the mobile device is authorized based on the mobile device use event data.

14. The method of claim 13, further comprising:

transmitting, by the logic unit, a message to a transportation system vehicle operator requesting that the transportation system vehicle operator discontinue the use of the mobile device, when the use of the mobile device is not authorized.

15. The method of claim 14, wherein the message is displayed to the transportation system vehicle operator over an operator interface.

16. The method of claim 12, further comprising:

transmitting the mobile device use event data in real-time from the logic unit to an off-board control system;

determining, at the off-board control system, whether use of the mobile device is authorized based on the mobile device use event data;

transmitting a message, from the off-board control system to the logic unit, requesting that a transportation system vehicle operator discontinue use of the mobile device, when the use is not authorized; and transmitting the message from the logic unit to the transportation system vehicle operator.

17. The method of claim 16, wherein the message is at least one of pre-defined and manually written.

18. The method of claim 12, further comprising:

transmitting a command from the logic unit to a video recorder to command a camera to begin recording based on the mobile device use event data;

transmitting a command from the video recorder to the camera to being recording;

recording, by the camera, a transportation system vehicle operator in the vehicle operator area;

transmitting the recording from the camera to the video recorder;

transmitting the recording from the video recorder to the logic unit; and storing the recording with the corresponding event signal and current status in the memory of the logic unit as the mobile device use event data.

19. The method of claim 12, wherein the system is activated when the transit vehicle is powered up.

20. The method of claim 12, wherein the current status comprises at least one of en route, on break and end of route.

* * * * *